United States Patent
Mougin et al.

(10) Patent No.: US 8,167,113 B2
(45) Date of Patent: May 1, 2012

(54) METHOD FOR GROUPING PRODUCTS OF THE VIAL TYPE AND OTHER

(75) Inventors: Didier Mougin, Octeville sur Mer (FR); Michel Begin, Octeville sur Mer (FR); Guillaume Duchemin, Octeville sur Mer (FR); Christophe Poupon, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 204 days.

(21) Appl. No.: 12/652,545

(22) Filed: Jan. 5, 2010

(65) Prior Publication Data

US 2010/0193327 A1    Aug. 5, 2010

(30) Foreign Application Priority Data

Jan. 6, 2009    (FR) ...................................... 09 50043

(51) Int. Cl.
*B65G 47/08*    (2006.01)
(52) U.S. Cl. ..................... 198/418.5; 198/429; 198/430; 198/370.07; 198/456
(58) Field of Classification Search .................. 198/431, 198/429, 430, 418.5, 370.07, 370.08, 456, 198/457.01
See application file for complete search history.

(56) References Cited

U.S. PATENT DOCUMENTS

| | | | | |
|---|---|---|---|---|
| 3,244,266 A | * | 4/1966 | Zappia | 198/430 |
| 3,687,262 A | * | 8/1972 | Campbell et al. | 198/430 |
| 3,724,639 A | * | 4/1973 | Hara | 198/430 |
| 4,635,784 A | * | 1/1987 | Bourgeois | 198/347.3 |
| 5,429,651 A | * | 7/1995 | Bolin | 65/241 |
| 6,019,213 A | * | 2/2000 | Schubert | 198/419.3 |
| 6,164,045 A | * | 12/2000 | Focke et al. | 53/543 |
| 6,644,461 B1 | * | 11/2003 | Imbert et al. | 198/419.2 |
| 6,786,322 B2 | * | 9/2004 | Pellicer Thoma | 198/432 |
| 7,264,108 B2 | * | 9/2007 | Borsarelli et al. | 198/429 |
| 7,416,072 B2 | | 8/2008 | Gosset | |

FOREIGN PATENT DOCUMENTS

| | | |
|---|---|---|
| EP | 1 052 200 A1 | 11/2000 |
| EP | 1 847 488 A1 | 10/2007 |
| FR | 2 847 242 A1 | 5/2004 |
| GB | 2 174 667 A | 11/1986 |

* cited by examiner

*Primary Examiner* — Mark A Deuble
(74) *Attorney, Agent, or Firm* — Sughrue Mion, PLLC

(57) ABSTRACT

The method consists in collecting products (2) that are arriving spaced and in line on a conveyor (1). This collection is carried out by means of a collector device (40), in the form of a comb, arranged transversally, forming an angle between 60 and 120° in relation to the product advancement direction (2). The collector (40) deposits and drops the collected products at a take-up station which is located on the side of said supply conveyor (1); it is capable of a loop movement that can be divided, for the collecting of said products, into a transversal movement combined with a longitudinal movement upwards of the vial queue.

The installation for the implementation of the method comprises a table (3) arranged at the level of and along the conveyor (1), a collector (40) carried by an appropriate structure in order to be displaced longitudinally and transversally above said conveyor (1) and said table (3).

The table (3) is comprised of two panels (31, 32) which extend on either side of the supply conveyor (1) in order to allow for the depositing and a dropping of the collected products on each side of said conveyor (1).

17 Claims, 5 Drawing Sheets

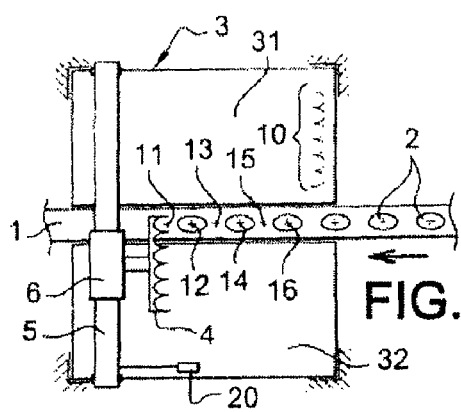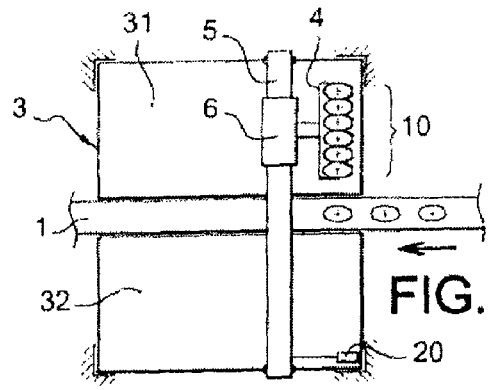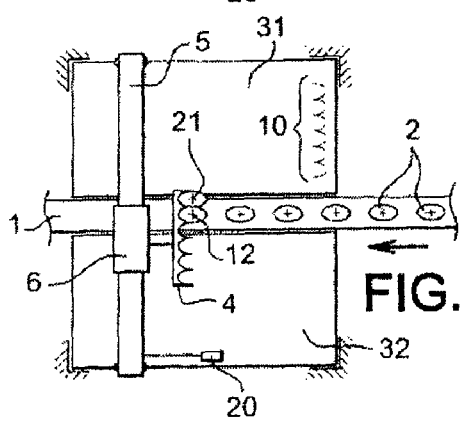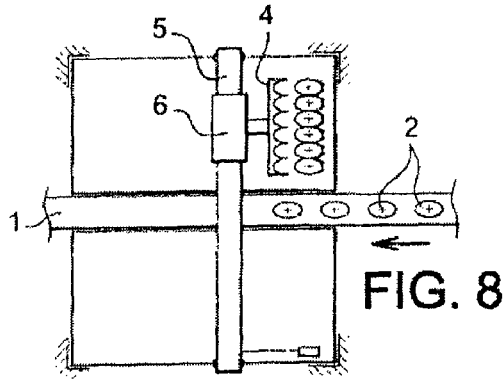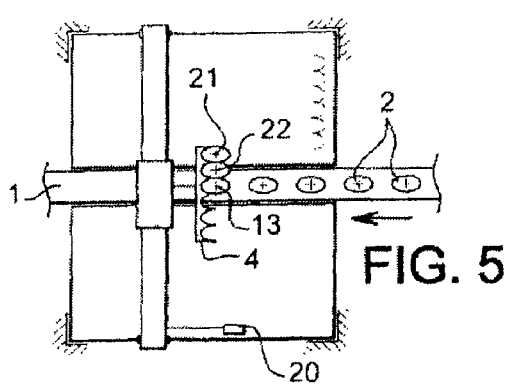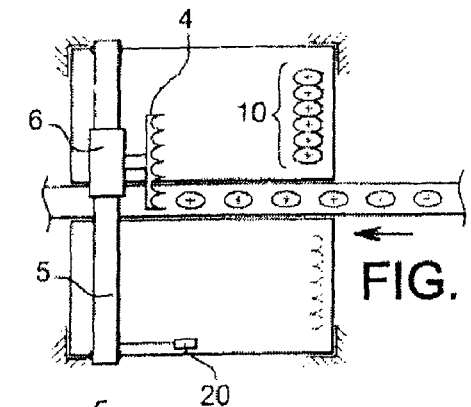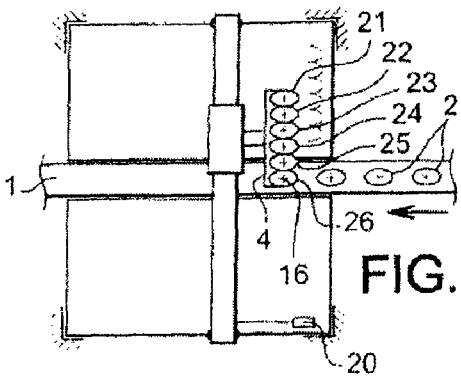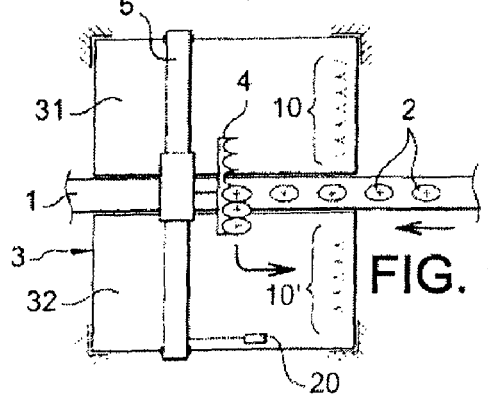

METHOD FOR GROUPING PRODUCTS OF THE VIAL TYPE AND OTHER

FIELD OF THE INVENTION

This invention relates to a method for grouping products in order to pack them into a case, for example; it also relates to the installation that allows it to be implemented.

The grouping of products of the vial, bottle or other type, can be carried out in several ways according to the type and the nature of the products and also according to the desired rates.

DESCRIPTION OF THE PRIOR ART

A form of grouping is described in GB 2174667. The products arrive in line on a supply conveyor and they are taken up, on the fly, by a pushing device which carries a batch of products.

This pushing device has the form of a rack which is arranged longitudinally, on the side of the line of products. This rack is capable of a combined loop movement: a longitudinal movement in the product advancement direction as well as a transversal movement, to deposit the batch of products in a row, on the side of the supply conveyor where they are taken again by other means.

Generally, the products arrive on the device for taking up being well distributed, regularly, according to the pitch of the teeth of the rack. The pitch setting of the products can be carried out by means of a rate adjuster located upstream of the supply conveyor or on the latter.

For products of particular forms, other than cylindrical forms, vials with oval section, for example, the orientation and the exact pitch setting for these products are carried out by means of a rate adjuster which is comprised of a pair of endless screws; these endless screws intervene upstream of the device for taking up a batch, between the machine for preparing products, of which the rate is relatively random, and the device for taking up which will supply said batch at the manipulation head for the case packing, for example.

This device for taking up cannot suffer from any disorder whatsoever pertaining to the distribution of the products. The batch of products must be perfectly established in order to be taken up by the pusher or other, before being picked up by the manipulation head which performs the case packing, for example.

When the installation is of the flexible type, i.e. able to process several types of products, tools must be provided for each type of product, pertaining to the device for taking up as well as pertaining to the rate adjuster.

The devices for taking up of the pusher type, or other, are generally comprised of a simple blade or strip made from thermoplastic material whereon are cut regulating teeth or cells; they are relatively simple to change and are inexpensive.

However, this problem of changing is different for rate adjusters with screw which are tools that are very expensive, relatively heavy and rather complicated to change.

Due to the weight of these screws, their changing is also an operation which can require handling equipment and their storage requires arrangements of the warehouse type, which relatively take up much space.

In addition, this type of installation which comprises, on the one hand, a rate adjuster and, on the other hand a device for taking up the batch, is particularly cumbersome in length, and can, in certain cases, not be adapted due to the constraints linked to the installation, in particular when the space is insufficient in the existing premises.

SUMMARY OF THE INVENTION

The invention proposes a method for grouping products such as, for example, products of the vial or same with oval section type, method making it possible to have an installation that is compact, relatively simple and above all having substantial capacities in terms of versatility and flexibility.

This method and the installation for its implementation also make it possible to consider the use of tools of great simplicity, that are easy to change and above all of an extremely modest cost, which makes it possible to create tools that are well adapted to each type of product, vial or same.

In addition this method makes it possible to shorten the length of the circuit followed by the products and therefore to reduce the risks of alteration of the latter by friction, in particular, on guides and other.

The installation is positioned directly at the output of the product preparation unit, after the filler and/or the labeller, for example.

It can also be a genuine accessory to be used only for specific work, for certain types of products, vials or other; the rest of the time it can be deactivated, shunted.

The method allows for a high degree of flexibility in use; the products, vials or other can also be grouped into one or several batches according to need. The invention makes it possible in particular, for vials with oval section, to carry out a grouping of several lots before they are boxed, in order to facilitate said boxing which can be carried out using a robot or other.

The method for grouping according to the invention makes it possible to form each batch of products using products, vials or others that arrive spaced and in line, in a queue, transported by a supply conveyor, method consisting in:
  collecting a certain number of products on said supply conveyor, by means of a device for collecting in the form of a comb, called a collector, which forms an angle between 60 and 120° with the longitudinal advancement axis of said products,
  depositing said products and in dropping them at a take-up station which is located on the side of said supply conveyor,
  enabling said collector with a loop movement that can be divided into a transversal movement, sometimes combined with a longitudinal movement upwards of the product queue, i.e. a movement that is opposite to that of said supply conveyor of these products,
  triggering the collecting of products according to the information that takes into account:—the position of said products on said supply conveyor in relation to said collector and,—the speed of said supply conveyor.

Still according to the invention, the method for grouping products consists:—in detecting the arrival of a product upstream of the collector,—in waiting for it where applicable and, at the very least, observing a pause at the time when said product detected reaches its position and is wedged in the allocated cell of said collector, then—in starting the combination of the transversal and longitudinal movements in order to prepare the following collection.

According to another arrangement of the invention, the method consists in collecting the products one after the other in different points on the supply conveyor, points which are shifted moving back up the line with the same interval between two consecutive points.

Still according to the invention, the method consists, when the collector is entirely filled,—in shifting transversally with its collected products in order to supply them to the depositing station, against a guide or in a structure for receiving in the form of a comb also, for example, then—in displacing said collector, in parallel and transversally to the product supply conveyor in order to, in a first step, pass up the queue of products to be collected and, then, return said collector to the first point of collecting.

According to another arrangement of the invention, the method consists in depositing the collected products, by the collector, on a single and same side of the supply conveyor, upstream of the last point of collection of said products.

According to an alternative embodiment of the invention, the method consists in depositing the collected products by the collector, alternatively on one side and then on the other side of the supply conveyor.

Still according to the invention, the method consists in depositing several rows of products, adjacently, with a transversal shift, before carrying out their grouping and their removal globally, by appropriate means of the robot type or other, in order to box them, for example.

The invention also relates to the installation which allows for the implementation of the method detailed hereinabove, this installation comprising:
- at least one table acting as a slider bed, arranged on and next to the supply conveyor of the products to be collected, in order to receive the products that have been collected,
- a device for collecting, or collector, in the form of a comb, arranged transversally in relation to the product advancement direction and forming an angle in relation to the longitudinal advancement axis of said products between 60 and 120°, mobile above said slider bed,
- an appropriate structure for displacing longitudinally and transversally said collector in relation to said supply conveyor,
- means for detecting the presence of a product to be collected on said supply conveyor, means which are arranged upstream of said collector and which are displaced longitudinally, simultaneously to the latter.

The invention also relates to the collector used and in particular a collector of which the form of each cell corresponds strictly to that of the product to be collected in such a way as to prevent friction and limit, in the case of high rates, the risks of bouncing of the product, these cells extending according to an axis which forms an angle between 60 and 120° in relation to the orientation of the entry line of said cells.

According to another arrangement of the invention, the collector comprises cells of which the longitudinal depth makes it possible to receive several products which are intended for longitudinal grouping.

Still according to the invention, the installation can comprise additional means which provide assistance in maintaining products on the take-up station, means which are comprised of a guide or of another structure, in the form of a fixed comb.

According to another arrangement of the invention, the installation can further comprise additional means in order to provide a certain stabilisation of the collected products during the operation of collecting, means which can be, for example, comprised of suction cups arranged in the bottom of the cells and implemented during said operation.

Still according to the invention, the installation can comprise at least one robot for taking up products, vials or other, which are grouped together on the table for receiving, whether they are arranged in one or several lines, robot being arranged with a head to pick up one or several lines of products, vials or other, and to box the latter, arranged at an angle or other.

According to another arrangement of the invention, the table for receiving products, vials or same, is comprised of a fixed plane, relatively smooth, whereon the collected products take place as they are displaced laterally by the collector.

Still according to the invention, the table for receiving collected products extends on either side of the supply conveyor in order to allow for the dropping of said collected products on the two sides of said supply conveyor.

According to another arrangement of the invention, the table for receiving products, vials or same, is comprised of an endless conveyor belt which is driven in order to accompany the collector in its movement and take up said products in order to provide a sort of buffer between said collector and the case packing robot for grouped products.

Still according to the invention, for the case of a case packing of the products in a box of the "wrap around" type, the installation can comprise a transversal pushing device that transfers the batch of products on the case packing system arranged at the edge of the table, whether entailing the table in the form of a fixed plane or the table in the form of an endless conveyor belt.

BRIEF DESCRIPTION OF THE DRAWINGS

But the invention shall be further detailed using the following description and the annexed drawings, provided for the purposes of information, and wherein:

FIGS. 3 to 8 show a few of the steps in the method for collecting products;

FIGS. 9 and 10 show an alternative of the installation which is provided with two dropping zones for the collected products;

DETAILED DESCRIPTION OF THE INVENTION

Figure 1:
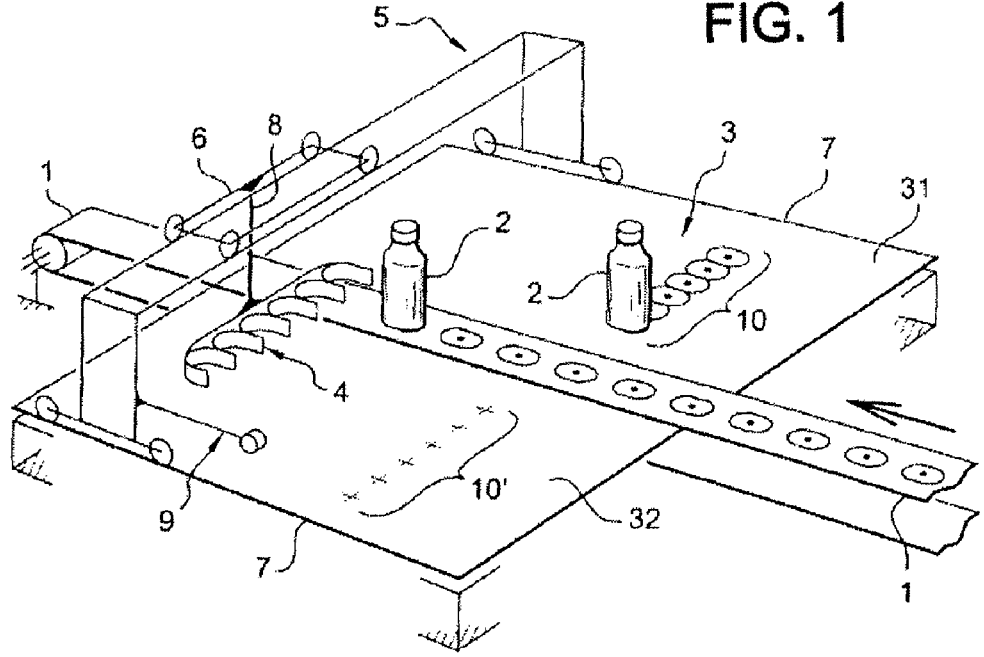
FIG. 1 is a perspective diagrammatical view of the installation according to the invention, associated with a product supply conveyor.

Such as is shown in FIG. 1, the installation comprises a supply conveyor 1 of products 2 which come, for example, from a preparation machine, not shown, such as a filler and/or labeller.

The products arrive in line, in a queue; they pass along a table 3 which acts as a slider bed; this table 3 can comprise a fixed plane comprised of a panel which extends along the conveyor 1, exactly at the same level; it can also, as shown in FIG. 1 and explained hereinbelow, be comprised of two panels 31 and 32 which extend on either side of the conveyor 1, forming a surface continuity; each panel 31, 32 being on the same level as the upper surface of this conveyor 1.

The supply conveyor 1 is unloaded of its products 2 by means of a device for collecting called a collector in the text, said collector 4, in the form of a comb, collects the products 2 one after the other as said conveyor 1 advances; it is arranged transversally in relation to the direction of advancement of said products 2 and it is shifted transversally, after each collection, by a distance which is of a magnitude of the width of said products 2.

In order to be able to unload the collected products and restart a cycle, the collector 4, as detailed hereinbelow, is also mobile longitudinally. It goes back up the queue of products in the opposite direction of the advancement of the supply conveyor 1 during the operation of collecting and, then, after depositing and dropping of the collected products, said collector goes back up the queue of products again, but in the direction of advancement of said conveyor this time, and at high speed, in order to pass up said file and be positioned rapidly in front of the first product to be collected.

In order to carry out these various movements, the collector 4 is mobile, carried and guided par a structure which comprises:—a sort of crane 5 able to be displaced longitudinally above the table 3, in parallel to the direction of displacement of the products 2 arranged on the conveyor 1, and,—a carriage 6 which is displaced on said crane 5, always above said table 3, transversally in relation to the direction of displacement of said products 2, collector 4 is suspended from said carriage 6.

The crane 5 is guided on rails 7 arranged on the table 3 and in particular on the lateral edges of each panel 31, 32, and it is mobile under the effect of a motor element, not shown, of the servo-reducing type or linear electric motor.

The carriage 6 is guided on beams arranged in the upper portion of the crane 5 and it is also mobile under the effect of a motor element, not shown, of the servo-reducing type or linear electric motor.

The collector 4 is fastened to the carriage 6 by the intermediary of a support in the form of arm 8; it is maintained at an appropriate height in relation to the products 2 to be collected.

The liaison between the arm 8 and the collector 4 is arranged to facilitate the model change operations; this collector comprises in fact a tool which is adapted to the form of the products 2 to be collected. It is comprised of a simple plate made of thermoplastic material.

A system 9 for detecting, installed on the crane 5, makes it possible to launch the collection cycle of products 2. Indeed, the information relating to the detection of the passage of a product makes it possible, according to the speed of advancement of the supply conveyor 1, to determine by means of an appropriate calculator, the moment of its integration into the allocated cell of the collector 4.

Using this integration, the collector 4 can start its shifting movement and position the free adjacent cell on the axis of the queue of products arranged on the supply conveyor 1, so that this cell is ready to receive the following product.

When the scheduled number of products 2 to be collected is reached, said products collected are carried and dropped at the take-up station 10 which is located on the table 3, in its upstream portion.

According to the type of products, the arm 8 can comprise several superimposed collectors, two for example, for products of which the height is such that they risk, in light of their instability, to cause incidents when they are taken up by a single collector 4.

The products 2 arrive in a queue on the supply conveyor. They are more preferably spaced, either naturally at the output of the preparation machine, or in a forced manner by appropriate means, not shown.

Figure 2:
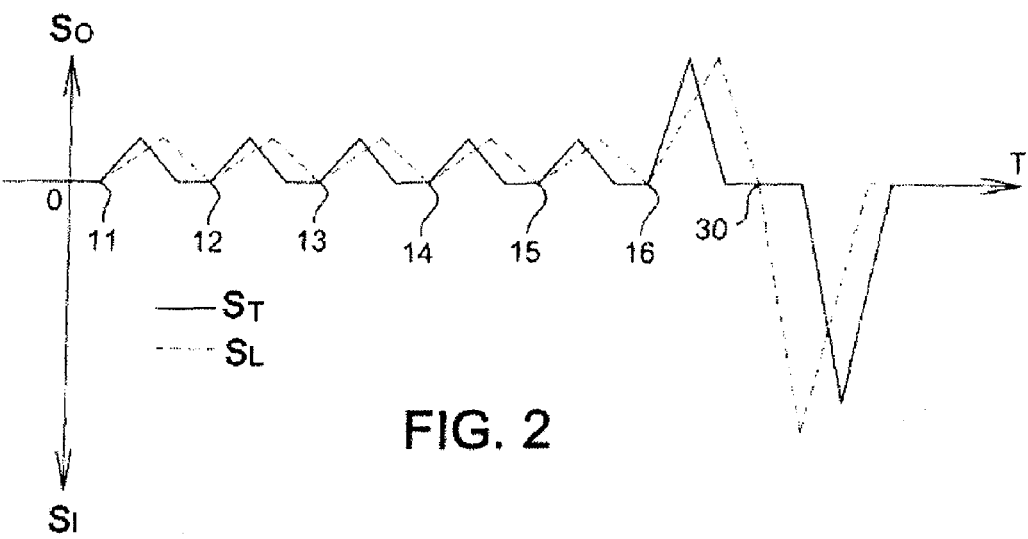
FIG. 2 is a time chart with the time T on the X-axis and the outbound OS and inbound IS speeds on the Y-axis, time chart showing a collection cycle of products with the displacement speed curves of the collector: a dashed-line curve for the transversal speed TS and, a dotted-line curve for the longitudinal speed LS.

FIG. 2 shows, in the form of a time chart, the outbound OS and inbound IS speeds of transversal displacement of the collector 4, according to time T.

The time chart shows a full collecting cycle of six products 2 with depositing at the take-up station 10 and returning to the first point of collecting.

These various collecting points appear on the time chart in FIG. 2 as well as in the following figures.

The first point marked 11 on the time chart corresponds to the moment when, as shown in FIG. 3, the collector 4 receives the first product 2, 21 which arrives with the conveyor 1.

Before this point 11, the collector 4 is in stand-by position, immobile, ready to receive the first product 2, 21.

This first product 21 is detected by the appropriate system 9 comprised of a cell 20 which appears in this FIG. 3 and in the following figures. This cell 20 is taken longitudinally with the collector 4; it precedes it.

As soon as the first product 21 is positioned in its cell of the collector 4, and thanks to the information given by the cell 20, said collector 4 is displaced, as indicated on the time chart, with a particular movement which comprises first of all a combination of movements which includes a transversal component and a longitudinal component, then, the transversal movement stops while the longitudinal movement continues and thus up to the time of the impact.

The duration of the transversal movement is therefore slightly shorter than that of the longitudinal movement.

This combination of movements is not permanent; it is only temporary and it makes it possible to allow time for the collector 4 to become stabilised in the transversal direction, before the collection of the product 2 which is presented to it.

The transversal movement of the collector 4 is stopped as soon as the second cell is wedged on the axis of the line of products 2 and said collector 4 is waiting for the impact of the second product 22 to be collected. This new impact takes place at a second point 12 which is also fixed, of which second point 12, FIG. 4, is located upstream of the first point 11 of collection, on the supply conveyor 1.

The distance between the two collecting points is according to several parameters such as, for example, the maximum acceleration and maximum speed capacities of the collector 4 combined with the particularities of the products in terms of stability, forms and dimensions.

In the embodiment shown in the figures, this distance is of a magnitude of half of the pitch that exists between two consecutive products 2 arranged on the conveyor 1.

At the time of the impact of the product 2, 21 with the collector 4, the speed of the product collected corresponds to the speed of the supply conveyor 1 and, at this precise instant, said collector 4 is immobile.

The collecting of the other products 23 to 26 takes place therefore step by step, as beforehand with, each time, a new fixed point for collecting which is distant from the previous point.

As shown in FIG. 5 as well as on the time chart in FIG. 2, the following point of collection is the point 13 then the points 14, 15 also shown on said time chart and, finally, the point 16, FIG. 6, where the collector 4 receives the last product 26 of the batch.

The collector 4 is then offset rapidly and entirely on the side of the conveyor 1, as shown in FIG. 7 and on the time chart, in order to deposit and drop its batch of products at the take-up station 10; depositing which is marked 30 on said time chart.

This take-up station 10 can comprise, as shown in the figures, an additional structure to receive the batch of products 21 to 26, structure which, in the form of a guide or, as shown in the figure, in the form of a comb, makes it possible to stabilise said products and to maintain them until they are taken up by a manipulation head, for example, as shown hereinbelow.

As soon as the batch of products 21 to 26 is at the take-up station 10, on the panel 31 of the table 3, the collector 4 is capable of a reverse movement, FIG. 8; this movement is carried out in parallel to the queue of products 2 arranged on the supply conveyor 1, at a speed that is higher than that of said conveyor 1, in order pass up said file and allow the collector 4 to be repositioned by a movement of translation, to the first point 11 of collection, as shown in FIG. 3, before restarting a collection cycle.

This cyclical movement, in a loop, has a duration which is determined by the moving speed of the products 2 which are brought by the conveyor 1, but above all by the time taken by each product to reach its point of collection and this time can vary according to the spacing between said products.

As soon as the operation of collecting properly speaking is completed, the cell 20 is placed on stand-by; it is in particular inactive during the reverse movement of the collector 4.

FIG. 9 shows an alternative embodiment of the installation.

This installation comprises a table 3, as indicated hereinabove, which has a complete symmetry in relation to the supply conveyor 1. This symmetry makes it possible to have two take-up stations 10 and 10' on the table 3:

the station 10 located on the panel 31, at the right edge thereof of said conveyor 1 and, the station 10' located on the panel 32, at the left edge thereof of said conveyor 1.

Each batch of products 2 collected is deposited and dropped alternatively on the sides of the conveyor 1, at the edge thereof, by the same collector 4.

This arrangement provides a movement to the collector 4 of which the shell is a loop which has a contour in the form of deployed butterfly wings. This movement of the collector 4 with comings and goings between the two stations 10, 10', makes it possible to limit the dead time.

The FIG. 9 shows the collector 4 in stand-by position at the first point 11 of collecting, after its return from the depositing station 10. The collecting is carried out, as described above, but the collector 4 progresses towards the second take-up station 10'.

During this collecting and depositing cycle on the left edge of the conveyor 1, the batch of products deposited at the station 10 of the right edge of said conveyor was removed, releasing the space for the arrival of a new batch of products 2.

The collector 4 can also comprise cells of which the longitudinal depth allows them to receive several products 2 and in particular products of which the form is intended for this type of longitudinal grouping.

During the loading of the collector 4, appropriate means can retain the collected products in the cells. These means are carried longitudinally with the collector 4. They can be comprised of suction cups arranged in the bottom of the cells of the collector 4 and which are implemented during the operation of collecting or means of the guide type, guide being retractable when the collector is presented to the taking up stations 10 and 10'.

Figure 11:
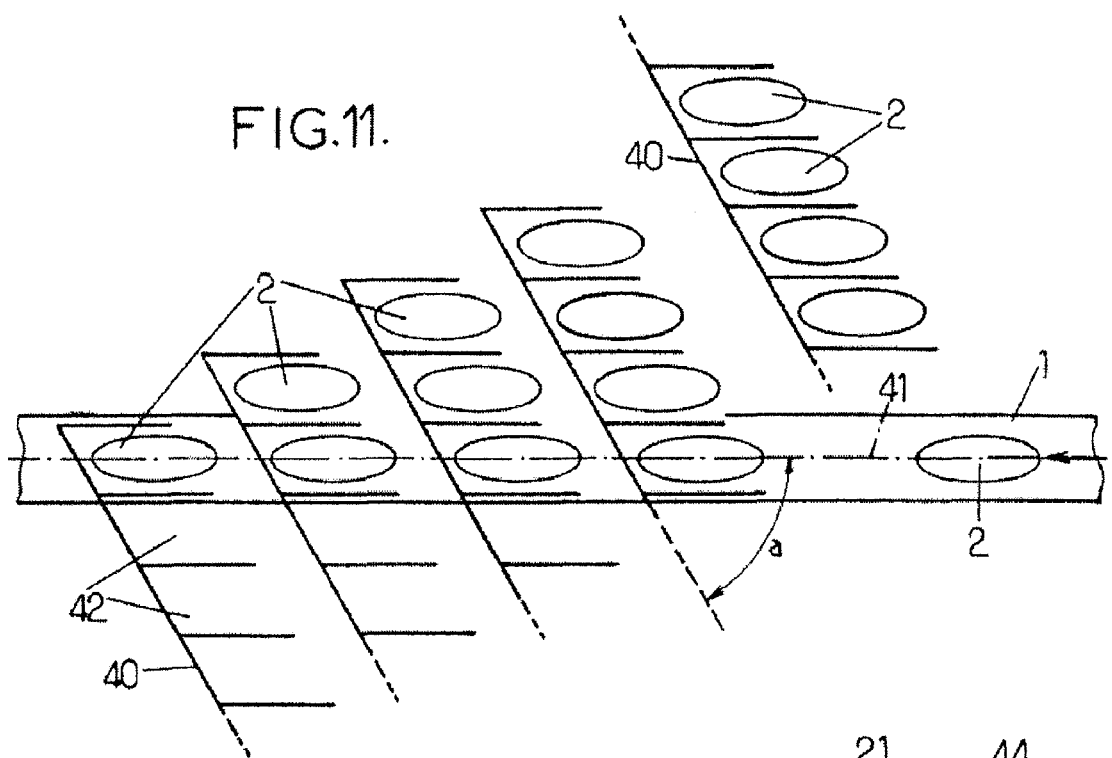
FIG. 11 shows a method for regrouping products, of the vials with oval section type, by means of a collector in the form of a comb which makes it possible to drop said vials according to a disposition at an angle.

FIG. 11 shows another collector model 4, marked 40, which makes it possible, with products of the vial type of which the section is oval, to carry out a grouping of these vials 2 at an angle.

As hereinabove, the vials 2 arrive in line, spaced apart in a queue, and they are transported by the supply conveyor 1.

These vials 2 are collected on the fly, on the longitudinal axis 41 of the supply conveyor 1, by means of the collector 40 which goes back up the queue of vials.

This collector 40 is arranged transversally but it forms an angle with the axis 41 of the supply conveyor. This angle a is, for example, between 60 and 120° in order to put the vials 2 in line, with an arrangement aligned at an angle, i.e. an arrangement which lends itself well to the storage and to the wedging of this type of vials 2 of which the section is oval.

The collector 40 is provided with several cells 42 which are oriented in parallel to the axis 41 of the supply conveyor 1; these cells 42 extend according to an axis which forms an angle between 60 and 120° in relation to the orientation of the line of their entry, i.e. in relation to the front of the collector. The form of the cells 42 corresponds to that of the vials 2 to be collected in order to limit and prevent the risks of bouncing.

When the collector 40 is full, it is released transversally in order to abandon the batch comprised of several vials 2 positioned at an angle, before returning to its position of departure, by moving back up the queue of vials which continues to advance on the supply conveyor 1. The displacement of the collector 40 is identical to that of the collector 4 detailed hereinabove in liaison with FIGS. 1 to 10.

Figure 12:
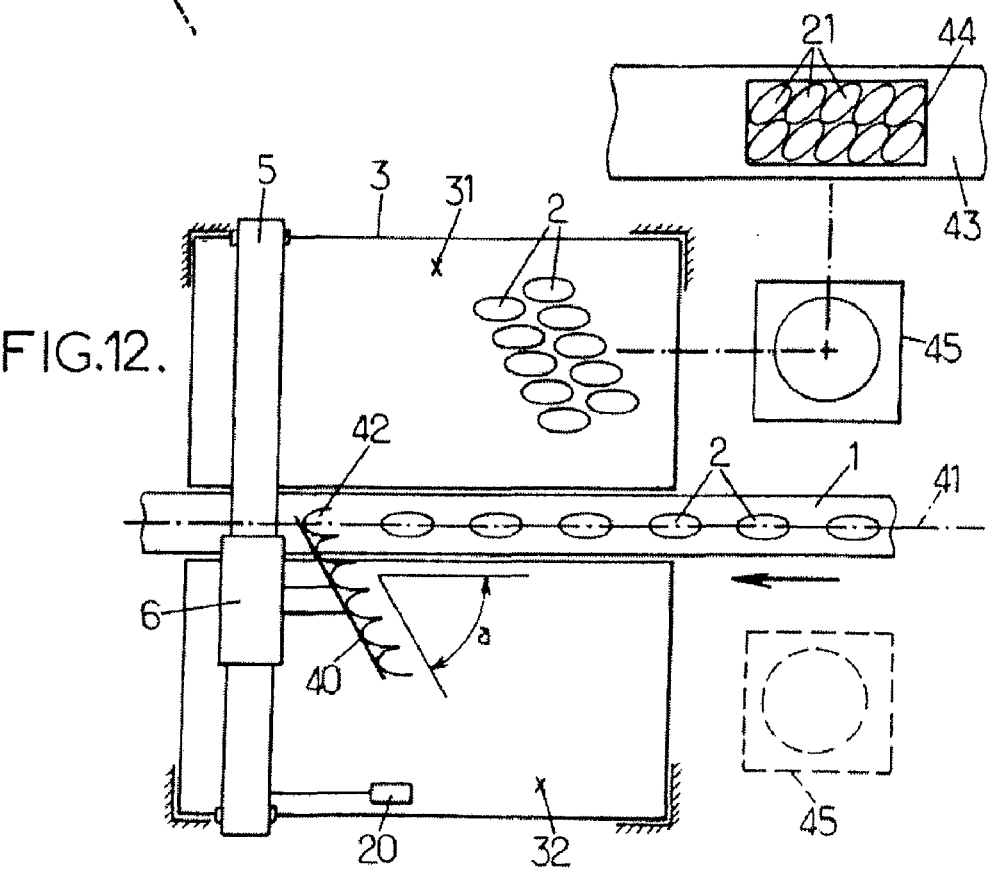
FIG. 12 shows, diagrammatically, a complete installation for grouping and boxing vials arranged at an angle in said box.

The collector 40 can deposit several lots of vials which are, as shown in FIG. 12, arranged according to two adjacent lines, for example.

This FIG. 12 shows, diagrammatically, an installation which is provided with a collector 40 forming an angle a with the axis of the supply conveyor 1, an angle between 60 and 120°, for example.

This collector 40 collects the vials 2, on the fly, in order to deposit them in the form of batches at an angle and in lines on the table 3, which acts as a simple transit table. The installation can in fact be associated with an additional station where the boxing of the vials 2 is carried out.

This additional station comprises a conveyor 43 whereon circulate boxes 44 and these boxes are, for example, filled with the vials 2 by means of a robot 45. This robot 45 can comprise a head, not shown, arranged to grasp one or several lots of vials 2 and introduce them into the box 44.

On this FIG. 12, note also that the vials 2 can be packaged in the box 44 arranged at an angle; this arrangement at an angle makes it possible to place a maximum of vials 2 in a reduced volume.

As hereinabove, the collector 40 can deposit vials 2 on one or the other of the tables 31 and 32 which are arranged on either side of the supply conveyor 1 of said vials 2. In this case, according to the rates, the installation can supply several robots, arranged symmetrically in relation to supply conveyor 1.

The collector 40 is carried and guided, as hereinabove, by means of a structure in the form of a crane 5 which is displaced longitudinally above the table 3, crane 5 serving as a guide for a carriage 6 which is displaced transversally and this carriage carries said collector 40.

Note that, in the figures, the vials 2 are regularly spaced on the supply conveyor 1. The spacing of the vials can, for example, be carried out by means of a simple spacing wheel or other, not shown.

Figure 13:
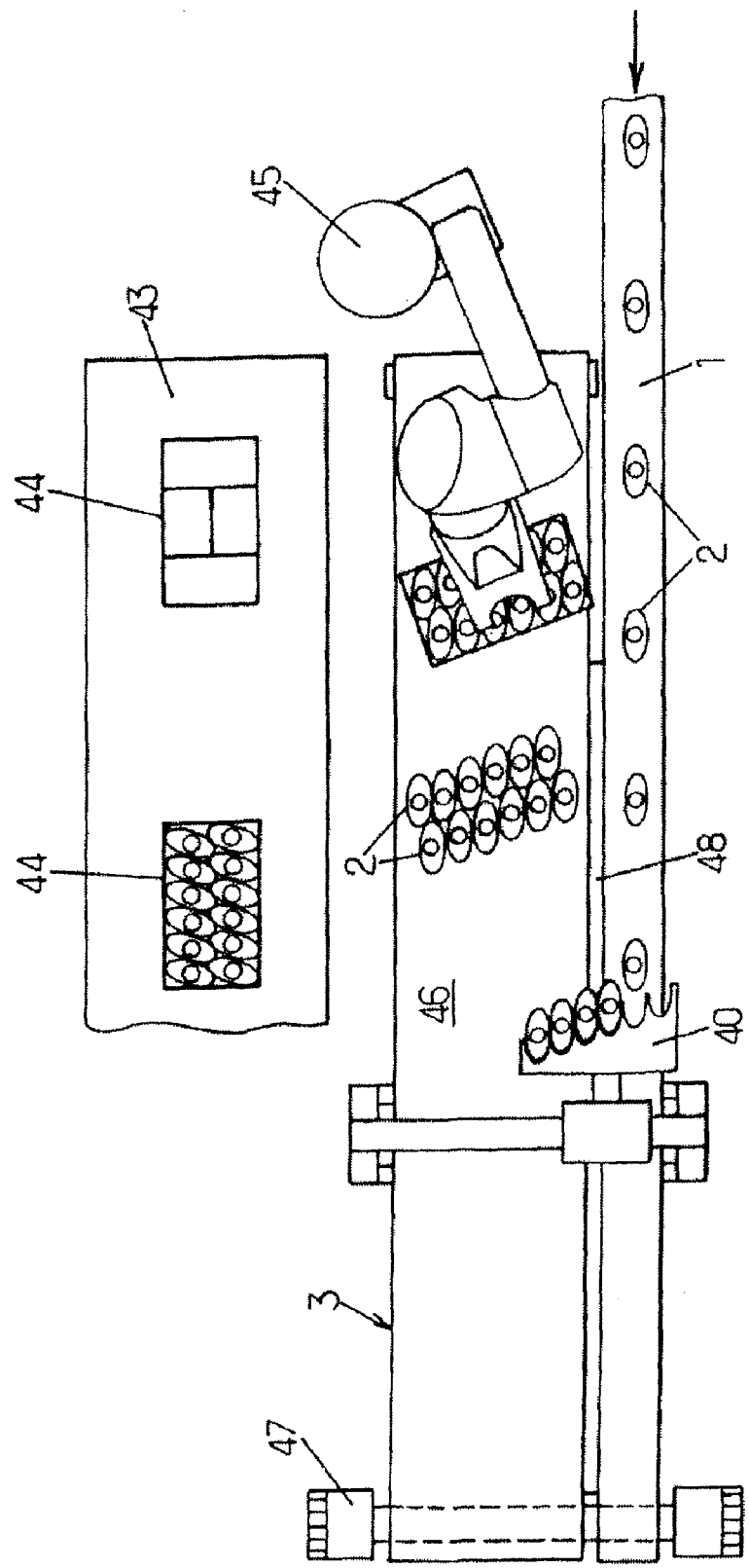
FIG. 13 shows an alternative embodiment of the installation and in particular of the take-up table for batches of products, this table having the form of an endless conveyor belt, associated with a case packing robot.
Figure 14:
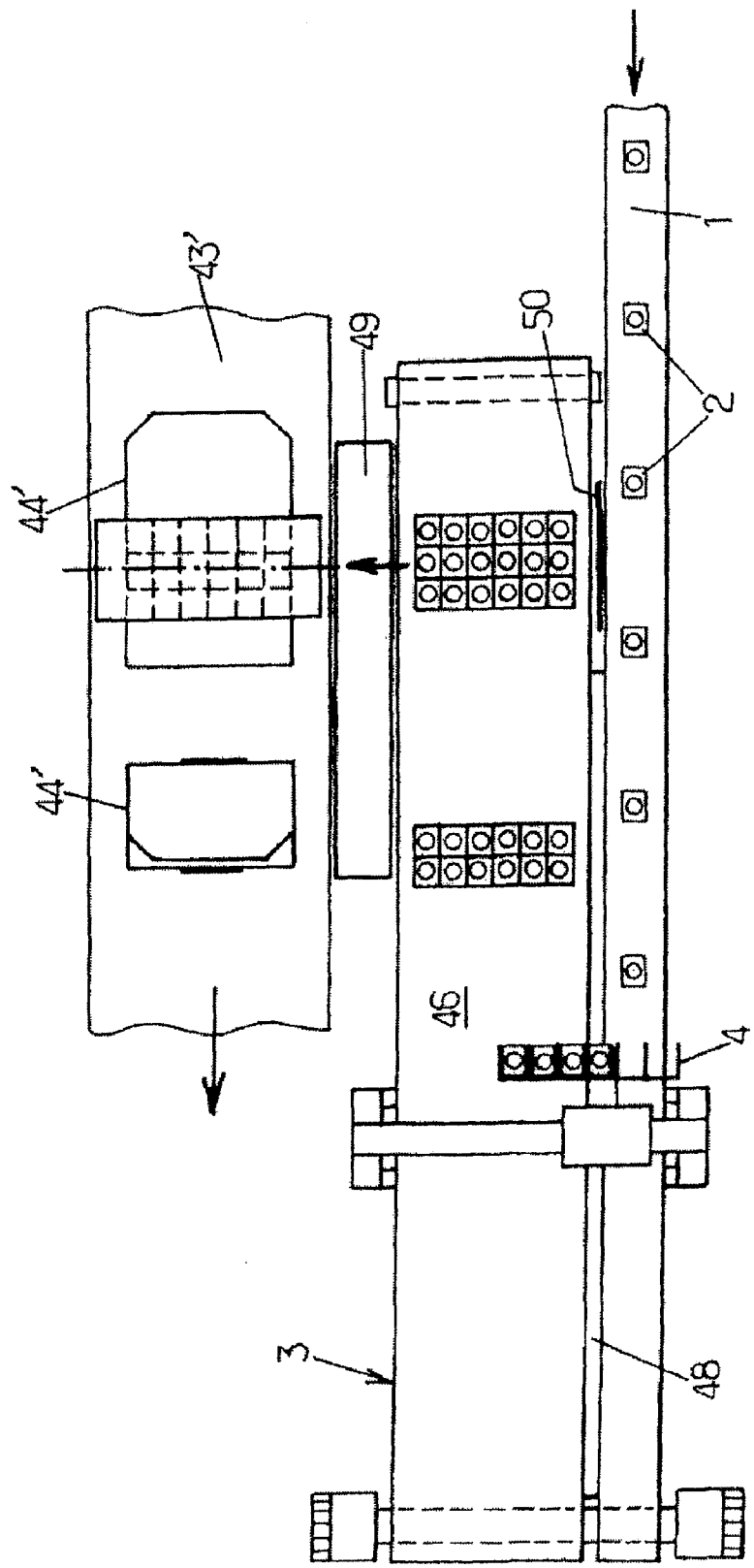
FIG. 14 shows another alternative of the installation, for the case of a case packing of the products into boxes of the "wrap" type.

FIGS. 13 and 14 show two embodiments of the table 3 for taking up batches of products 2; FIG. 13 shows a table 3 where the batches are formed by the collector 40 and FIG. 14 shows a table where the batches are formed by the collector 4, which forms an angle of 90° in relation to the longitudinal axis 41 of the supply conveyor 1 of the products 2.

In both cases, the take-up table 3 is comprised of a conveyor 46 of the endless belt type, belt which is driven by a servomotor 47 under the control of an automaton which handles the displacements of the various mobile members of the installation of which the collector 4, the collector 40 and said conveyor 46.

This conveyor 46 is displaced in a direction which is the opposite in relation to that of the supply conveyor 1. Its displacement is synchronised with that of the collector 4, or 40, in order to receive the products 2 which are displaced by said collector 4, or 40, and in order to act as a buffer and accumulating conveyor.

This accumulation of batches of products 2, on the conveyor 46, allows the robot 45 to have a wider range of time and above all a range of time that are easier to manage in order to carry out the operation of case packing of the batches of products 2 in the boxes 44 which are circulating on the conveyor 43.

The supply conveyor 1 of the products 2 is separated from the take-up conveyer 46 of the batches by a fixed slider bed 48 which forms the junction and provides a surface continuity between the two.

This slider bed 48 has a length which corresponds at least to the longitudinal travel of the collector 4, 40.

FIG. 14 shows an alternative embodiment wherein the batches of products 2 are placed in boxes of the "WRAP" type.

The batches of products 2, accumulated on the conveyor 46, are ready to be introduced into a box 44' of the "WRAP" type which is located on a case packing installation comprising a conveyor 43' which is parallel to the conveyor 46. Between the take-up conveyer 46 and the case packing conveyor 43', a fixed slider bed 49 is located which creates a surface continuity in order to allow for the displacement and the introduction of the batch of products 2 into the box 44'. The batches of products 2 are transferred by means of a pusher 50 which appears, in the figure, between the supply conveyor 1 and the take-up conveyer 46, pusher 50 which is capable of a transversal movement, perpendicular to the direction of supply of the products 2 on the conveyor 1.

This pusher 50 is carried and guided by means of a structure, not shown, of the crane type.

What is claimed is:

1. Method for grouping products to form a batch to be taken up by appropriate means, the products arriving, in a queue, and transported by a supply conveyor, said method comprising:

collecting at least one of the products on said supply conveyor, with a collector comprising a comb which is arranged transversally and forms an angle α between 60° and 120° with respect to a longitudinal axis of said supply conveyor;

depositing said products at a take-up station which is located on a side of said supply conveyor;

providing said collector with a loop movement, to execute the collecting and the depositing, the loop movement comprising a transversal movement and a combination of a transversal movement and a longitudinal movement upwards of the queue; and triggering the collecting according to information that takes into account a position of said products on said supply conveyor in relation to a position of said collector and a speed of said supply conveyor, wherein the collecting comprises:

detecting an arrival of one of the products to be collected;

observing a pause at an instance when said one product reaches its position and is wedged in a respective allocated cell of said collector, starting the combination of the transversal and longitudinal movements in order to prepare for the collecting, stopping the transversal movement of said collector and the longitudinal movement at a time of an impact with another one of the products to be collected.

2. The method of claim 1, wherein the products comprise at least one of bottles and containers.

3. Method for grouping products according to claim 1, wherein the collecting further comprises:

collecting the products one after another in different collecting points on the supply conveyor, said collecting points being shifted moving back up the queue of said products with the same interval between two consecutive collecting points;

wherein a first product is collected at a first collecting point and a last product is collected at a last collecting point.

4. Method for grouping products according to claim 3, wherein further comprising:

shifting transversally said collector with the products collected when the collector is entirely filled, supplying said products to the take up station, against a guide or in a receiving structure comprising a comb and displacing said collector, in parallel to the supply conveyor, in a first step to pass up the queue and a next first product to be collected and, in a second step, longitudinally and transversally to return said collector to the first collecting point.

5. Method for grouping products according to claim 4, wherein the depositing comprises:

depositing the products collected by the collector, on a single and same side of the supply conveyor, upstream of the last collecting point.

6. Method for grouping products according to claim 4, wherein the depositing comprises:

depositing the products collected by the collector, alternatively on a right edge and on a left edge of the supply conveyor.

7. Method for grouping products according to claim 1, wherein the depositing comprises:

depositing the products disposed in several rows, adjacently, with a transversal shift, and carrying out grouping and removal of the products globally, by a robot.

8. Installation for the implementation of a method for grouping products, the installation comprising:

a supply conveyor which transports said products along a longitudinal axis of the supply conveyor;

at least one table comprising a slider bed, arranged next to the supply conveyor to receive said products;

a collector comprising a comb arranged transversally with an angle α between 60° and 120°, with respect to a longitudinal axis of the supply conveyor, which is mobile above said table;

a structure which carries and displaces longitudinally and transversally said collector in relation to and above said supply conveyor and the table; and a detector which detects a presence of a product to be collected on said supply conveyor, said detector being arranged upstream of said collector, and being displaced longitudinally with the collector.

9. Installation according to claim 8, wherein the table for receiving the products collected is comprised of two panels which each extends on a respective left or right side of the supply conveyor so that said products, which are collected on the collector, are dropped on the left and right sides of said supply conveyor.

10. Installation according to claim 8, wherein the collector comprises cells having an entry line and each having a respective form which corresponds to a form of the products to be collected to limit bouncing of the product collected on said collector when said product is set into place in a respective cell, said cells extending according to an axis which forms an angle between 60° and 120° in relation to an orientation of the entry line of said cells.

11. Installation according to claim 10, wherein the collector comprises cells having a longitudinal depth, to receive several products which are intended for a longitudinal grouping.

12. Installation according to claim 8, further comprising:

at least one robot which takes up the products, arranged at an angle, said robot comprising a head arranged to pick up several products disposed in a line and to box the products on a conveyor arranged in a vicinity of the table.

13. Installation according to claim 8, wherein the table comprises an endless belt conveyor being driven in order to accompany a moving collector and to take up said products in order to provide an accumulation of the products.

14. Installation according to claim 13, wherein, for packing the batches of the products in a box of the "wrap around" type, said installation further comprises a pusher which is arranged transversally with respect to the endless belt conveyor, and transfers the batch of the products on a case packing conveyor system.

15. The installation of claim 8, wherein the products comprise at least one of bottles and containers.

16. Installation for the implementation of a method for grouping products, the installation comprising:

a supply conveyor which transports said products along a longitudinal axis of the supply conveyor;

at least one table comprising a slider bed, arranged next to the supply conveyor to receive said products;

a collector comprising a comb, which is arranged transversally with an angle $\alpha$ between 60° and 120° with respect to the longitudinal axis of the supply conveyor which is mobile above said table;

a structure which carries and displaces longitudinally and transversally said collector in relation to and above said supply conveyor and said table; and a detector which detects a presence of a product to be collected on said supply conveyor, is arranged upstream of said collector, and is displaced longitudinally with the collector, wherein said table comprises two panels each extending on a respective left or right side of the supply conveyor, so that said products, which are collected by the collector, are dropped the left and right sides of said supply conveyor.

17. The installation of claim 16, wherein the products comprise at least one of bottles and containers.

\* \* \* \* \*